United States Patent Office 3,639,438
Patented Feb. 1, 1972

3,639,438
α-POLYFLUOROALKYL ACRYLIC ACIDS AND DERIVATIVES
Kenneth C. Smeltz, Wilmington, Del., assignor to E. I. du Pont de Nemours and Company, Wilmington, Del.
No Drawing. Filed Feb. 20, 1968, Ser. No. 706,803
Int. Cl. C11c 3/00
U.S. Cl. 260—408       3 Claims

ABSTRACT OF THE DISCLOSURE

α-Polyfluoroalkyl acrylic compounds of the formula $$R_f(CH_2)_m-\underset{V}{C}=CH_2$$

where $R_f$ is perfluoroalkyl, $m$ is 2 to 12, and V is —COOH, —COOR, —CONR$_2$, —COX or —CN.

Homopolymers of the above compounds formed by polymerization through the double bond of the acrylic moiety.

Copolymers of the above compounds with other vinylidene monomers.

The polymers are useful in treating substrates to impart oil and water repellency thereto.

BACKGROUND OF THE INVENTION (1) Field of the invention

This invention relates to acrylic acid monomers, selected derivatives and polymers thereof. More specifically, the invention is directed to α-polyfluoroalkyl acrylic acids, carboxy-based derivatives thereof and polymers derived therefrom.

(2) Description of the prior art

Compounds containing perfluoroalkyl groups which impart oil and water repellency to substrates are well known, and perhaps best known, for their outstanding properties, are the perfluoroalkyl-containing acrylic acid derivatives. All of these, however, have the perfluoroalkyl group attached to the acrylic acid portion of the molecule through a functional group such as an ester, amide or sulfonamide linkage, e.g., $R_fSO_2N(R)CH_2CH_2O_2CCH=CH_2$, $$R_fCH_2O_2CCH=CH_2$$

or $R_fCH_2CH_2O_2CC(CH_3)=CH_2$, where $R_f$ is the perfluoroalkyl group. Thus, being esters, amides, and the like, these compounds when polymerized through the acrylic double bond, are subject to attack by reagents which attack esters, amides or the like. In particular, the influence of acids or bases leads to hydrolysis of the ester or amide linkage. When such occurs, the perfluoroalkyl group, which is the group responsible for the oil- and water-repelling properties, is split off and is lost, thereby causing the substarte to lose its oil- and water-resistant properties.

At the present time, there are no acrylic-type acid monomers available for preparing oil- and water-repellent polymers and copolymers that do not have the perfluoroalkyl group attached through a functional group which is susceptible to hydrolysis by acids or bases.

The invention described hereinbelow provides monomers containing perfluoroalkyl groups and polymers thereof which are not subject to separation of the perfluoroalkyl group by hydrolysis or like reactions.

SUMMARY OF THE INVENTION

The monomers of this invention are represented by the structural formula (1)     $R_f(CH_2)_m-\underset{V}{C}=CH_2$ wherein $R_f$ is a perfluoroalkyl group of four to twenty carbon atoms, $m$ is an integer of two through twelve, and V is a group selected from carboxy (—COOH), lower carbalkoxy (—COOR wherein R is lower alkyl), carboxamido (—CONR$_2''$ wherein R″ is hydrogen or lower alkyl), halocarbonyl (—COX wherein X is chlorine, fluorine or bromine) or nitrile (—CN).

The polymers of this invention include homopolymers of the monomers of Formula 1, and copolymers of said monomers with vinylidene comonomers, which contain at least 25 percent by weight units derived from the monomer of Formula 1.

Thus, the polymers will contain the recurring unit (2)     $-CH_2-\underset{(CH_2)_mR_f}{\overset{V}{\underset{|}{C}}}-$ The process aspects of this invention comprise the process of preparing the compound of Formula 1 by subjecting a compound of the formula (3)     $R_f(CH_2)_m\underset{CH_2NR_2'}{\overset{|}{C}}(CO_2R'')_2$ where R′ is lower alkyl and $R_f$, R″ and $m$ are defined as above, to an aqueous alkali solution; and the process of preparing the compound of Formula 3 by reacting the compound of the formula (4)     $R_f(CH_2)_mC(CO_2R'')_2H$ with formaldehyde and $R_2'$ NH wherein $R_f$, R″, R′ and $m$ are defined as above.

DESCRIPTION OF THE INVENTION

The group $R_f(CH_2)_m-$ is common to all the compounds and polymers of this invention, and is the group that imparts the oil- and water-repelling property to the polymeric compositions. The group $R_f-$ can be either straight-chain or branched and can be cyclic although these latter groups are less desirable because of their general unavailability. The $R_f$ group should contain at least four carbon atoms since smaller groups do not result in useful oil and water repellency. The above-stated maximum carbon limit of twenty is given for reasons of availability only. Preferably, $R_f$ contains 6–12 carbon atoms and is straight-chained. Representative perfluoroalkyl groups include the perfluorinated groups derived from butyl, amyl, hexyl, heptyl, octyl, decyl, dodecyl, tetradecyl, hexadecyl, octadecyl, eicosyl, isoamyl, isoheptyl, cycobutyl, cyclohexyl, methylcyclohexyl and the like. Of these, the groups hexyl to dodecyl are preferred. The —(CH$_2$)$_m$— group is preferably the divalent straight-chain group where $m$ is 2–12, although it can be branched. Most preferably, $m$ is an integer of 2–4. Representative —(CH$_2$)$_m$— groups include ethylene, butylene, decylene and dodecylene.

The term "lower alkyl" as used herein signifies an alkyl group of one through six carbon atoms, as for example, methyl, ethyl, propyl, tert.-butyl and hexyl.

Monomers of Formula 1 wherein V is carboxy are prepared from the malonic acid derivatives of Formula 4, i.e., $R_f(CH_2)_mCH(COOH)_2$, by reacting it with formaldehyde and a diloweralkylamine to form the product of Formula 3, i.e., $$R_f(CH_2)_m\underset{CH_2NR_2'}{\overset{|}{C}}(COOH)_2$$

This reaction is, in general, described by F. F. Bliche in volume I of Adam's "Organic Reactions," Wiley, New York, 1942, at pp. 318–319. In general, the malonic acid $R_f(CH_2)_mCH(CO_2H)_2$ and dialkylamine $R_2'$NH are combined in a suitable solvent, forming a salt. A very convenient solvent is aqueous tetrahydrofuran. The mass is cooled to about ice temperature and an excess of formaldehyde is added. The resulting amino acid $$R_f(CH_2)_m\underset{\underset{CH_2NR'_2}{|}}{C}(CO_2H)_2$$

is recovered directly from the reaction mixture. Although ammonia and most primary amines will undergo the reaction, it is preferable to use a secondary amine in the present case, particularly dimethylamine, to avoid the side reactions known to occur with ammonia or primary amines. The intermediate of Formula 3 obtained is then converted to the carboxy compound of Formula 1 by heating the intermediate with aqueous alkali. Acidification of the reaction mass gives $$R_f(CH_2)_m\underset{\underset{COOH}{|}}{C}=CH_2$$

directly.

The starting material of the process described in the preceding paragraph, i.e., the compounds of Formula 4, is prepared by reacting the malonic acid ester $$CH_2(COOR'')_2$$

where R'' is lower alkyl, with the compound $$R_f(CH_2)_m\text{—}Z$$

in the presence of a reagent capable of converting $$CH_2(COOR'')_2$$

to the anion $[CH(COOR'')_2]^-$. Z is a displaceable group such as halogen (chlorine, bromine or iodine) or arylene sulfonates. A number of bases capable of forming the carbanion $[CH(COOR'')_2]^-$ are known. These include alkali metal alkoxides such as sodium butoxide, potassium methoxide, and rubidium isopropoxide; alkali metal amides, sodium triphenylmethide, sodium hydride or sodium or potassium metal. The reaction procedure is described generally by Cope, Holmes and House in Chapter 4, volume 9, of "Organic Reactions," Wiley, 1957, and more specifically in U.S. application Ser. No. 656,076, filed July 26, 1967. Reaction pressure, amounts of ingredients and time of reaction are generally not critical. The reaction is preferably carried out employing an alkali metal alkoxide as the base, in which case the alcohol precursor of the alkoxide is used in excess as the solvent. Reaction temperatures are preferably reflux temperatures, and the reaction is carried out under substantially anhydrous conditions. The initial product obtained is the ester. The corresponding acids are obtained by saponification of the ester.

Monomers of Formula 1 wherein V is carbalkoxy (—COOR) are prepared by reacting the acid monomer $$R_f(CH_2)_m\underset{\underset{COOH}{|}}{C}=CH_2$$

with an alcohol by using well known esterification techniques, i.e., an acid catalyst. The acid monomer, alcohol and an acid such as sulfuric acid are heated, usually by refluxing, in a hydrocarbon such as toluene or benzene which forms azeotropes with water. The water formed in the esterification is removed by distillation of the azeotrope in the well-known manner. This method is generally applicable to alcohols, e.g., methanol, ethanol, propanol, isopropanol, hexanol, dodecanol and octadecanol, and glycols, e.g., ethylene glycol, propylene glycol, trimethylene glycol, tetramethylene glycol, butylene glycol, and other hydroxyl-bearing substances.

Likewise, the acid halide monomers of this invention (where V is —COX) are prepared by well known techniques by adding thionyl chloride, phosphorus pentachloride, and the like, and refluxing the mixture.

The carbamido monomers of this invention are also prepared through well known techniques by reaction of the said halides obtained in the preceding paragraph with ammonia, primary or secondary amines. Any primary amine may be used. The secondary amines may be any aliphatic secondary amine or N-alkylarylamine such as dialkylamines, dihydroxyalkylamines, N - alkylanilines, pyrrolidines, piperidines, morpholine or the like. As is true when reacting most acrylic acids with amines, conditions should be avoided which would lead to the so-called, 1,4-addition of the amine to the unsaturated acid.

The nitriles of this invention are prepared by dehydration of the amides $$R_f(CH_2)_m\underset{\underset{COOH}{|}}{C}=CH_2$$

using well known reagents such as thionyl chloride, phosphorus oxychloride, phosphorus pentachloride or phosphorus pentoxide and heat (see Wagner & Zook, "Synthetic Organic Chemistry," Wiley, New York, 1953, pp. 596–598).

The monomers $$R_f(CH_2)_m\underset{\underset{V}{|}}{C}=CH$$

are not readily homopolymerized by free radical initiation; however, anionic polymerization occurs more readily. Thus, the ester monomers $$R_f(CH_2)_m\underset{\underset{CO_2R}{|}}{C}=CH_2$$

can be homopolymerized in dry tetrahydrofuran solution at very low temperatures, e.g., −78° C., using initiators such as sodium-naphthalene. The nitriles and N,N-disubstituted amides undergo similar polymerization.

Unlike homopolymerization, copolymerization of the monomers $$R_f(CH_2)_m\underset{\underset{V}{|}}{C}=CH_2$$

takes place using free radical initiation with more facility. Both ionizing radiation (ultraviolet light) and free radical forming initiators (peroxides, aliphatic azo compounds) are useful. The monomers $$R_f(CH_2)_m\underset{\underset{V}{|}}{C}=CH_2$$

may, in general, be copolymerized with any copolymerizable vinylidene monomer containing the polymerizable group $CH_2=C<$. Vinyl monomers containing the group $CH_2=CH—$ are, of course, a subclass of the broader vinylidene monomer class. Useful types include acrylic and methacrylic acid and their aliphatic esters of 1–18 carbons, nitriles, amides, hydroxymethylamides, vinylethers, vinyl esters, vinyl ketones, vinylaromatics such as styrene, 1,3-dienes such as 1,3-butadiene, 2-chloro-1,3-butadiene and isoprene. Among the useful esters of acrylic and methacrylic acids are included not only the alkyl esters (methyl, ethyl, butyl, octyl, lauryl, octadecyl) but also substituted alkyl such as hydroxyethyl, hydroxypropyl, glycidyl and dialkylaminoethyl esters. The preferred polymers contain small amounts of the hydroxyalkyl, glycidyl or dialkylaminoalkyl esters or hydroxymethylamides of acrylic or methacrylic acid to increase durability of the polymers on substrates to laundering and dry cleaning.

The usual bulk, solution, or emulsion systems for free radical polymerization may be used. Useful initiators include peroxides such as benzoyl peroxide, diluaroyl peroxide, ditertbutyl peroxide, tert-alkyl peroxy benzoates such as tert-butyl peroxy benzoate, aliphatic azo compounds such as azobis(isobutyronitrile), abobis(isovaleroyl nitrile), azobis(isobutyramidine dihydrochloride) and the like. As is well known in the art, solution polymerizations use solvents which are relatively inert to attack by free radicals. Hydrocarbons such as benzene, inert alcohols such as tert-butanol, acids such as acetic acid, inert nitriles such as acetonitrile or benzonitrile and inert halocarbons such as trichlorotrifluoroethane are typical examples. Others are known in the art. As is known in the art, useful polymerization temperatures vary with the initiator used. Thus peroxy anhydrides such as benzoyl peroxide and the aliphatic azo compounds generally require 60–100° C. while the peroxy esters and ditertalkyl peroxides are better used at 100–130° C.

The preferred polymerization system is an aqueous emulsion system using a water-insoluble initiator such as benzoyl peroxide or azobis(isobutyronitrile) at 60–100° C.

The polymers may be applied to textiles and like substrates either as aqueous emulsions or as solutions in suitable organic solvents such as trichlorotrifluoroethane, trichloroethylene or tetrachloroethylene. After the solvent is removed, the fabric is cured by heating, at about 150–200° C. for about 0.5–5 minutes.

Both the homo- and copolymers may be applied to textiles alone or they may be coapplied in a mixture with a non-fluorinated polymer as suggested by Fasick, Johnson & Raynolds in French Pat. 1,327,328, or Hauptschein et al. in U.S. Patent 3,304,278. The advantages of such coapplication are pointed out in these references.

The following examples illustrate the present invention but are not meant to limit the invention. All parts are by weight unless specified otherwise.

EXAMPLE 1

Preparation of the starting precursor
$R_f(CH_2)_mCH(CO_2C_2H_5)_2$

Diethyl malonate (0.75 mole) was added dropwise to a solution of 0.75 mole of potassium tert-butoxide in 3 moles tertbutanol under nitrogen over a 90 minute period. The mixture was then stirred at 70–75° C. for 1–1.5 hours. Then 0.5 mole of $R_fCH_2CH_2I$ was added dropwise over a period of one hour, followed by stirring for 18 hours at 70–75° C. The mass was then cooled to room temperature, diluted with 200 parts water and neutralized with 10% aqueous hydrochloric acid. The separated organic layer was collected, the aqueous layer extracted with ether and the combined organic layers were extracted with 10% aqueous sodium thiosulfate and dried over sodium sulfate. After removal of the drying agent by filtration, the solution was distilled, usually at reduced pressure after the ether was removed.

The products obtained (set forth as the products of specific $R_fCH_2CH_2I$ reactants), their yields, physical properties and analyses are given below:

(1) $n-C_4F_9CH_2CH_2CH(CO_2C_2H_5)_2$, 50–70% yield, B.P. 98.0–100.0° C. at 1.7 mm. Hg, $n_D^{20}$ 1.3646.

Analysis.—Calcd. for $C_{13}F_9H_{15}O_4$ (percent): C, 38.5; H, 3.8; F, 41.8. Found (percent): C, 38.9, 39.1; H, 3.7; 3.7; F, 40.6, 40.6.

(2) $n-C_6F_{13}CH_2CH_2CH(CO_2C_2H_5)_2$, 74% B.P. 95° C./1.0 mm. to 105° C./0.30 mm. Hg, $n_D^{20}$ 1.3602–1.3567.

(3) $n-C_8F_{17}CH_2CH_2CH(CO_2C_2H_5)_2$, 37–71% yield, $n_D^{20}$ 1.3530, B.P. 95.5° C./0.05 mm. Hg, 104–107° C./0.4 mm.

Analysis.—Calcd. for $C_{17}H_{15}F_{17}$ (percent): C, 33.7; H, 2.5; F, 53.3. Found (percent): C, 33.5; H, 2.4; F, 53.5.

(4) $n-C_{10}F_{21}CH_2CH_2CH(CO_2C_2H_5)_2$, 69–77% yield, B.P. 122–123° C./0.35 mm.; 152–155° C./5.0 mm.

Analysis.—Calcd. for $C_{19}H_{15}O_4F_{21}$ (percent): C, 32.3; H, 2.1; F, 56.6. Found (precent): C, 32.1, 32.0; H, 2.4, 2.2; F, 56.5, 56.5.

(5) The above procedure was repeated using an equimolar amount of 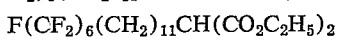(tosylate ester of $F(CF_2)_6(CH_2)_{11}OH$). A 95% yield of the ester $$F(CF_2)_6(CH_2)_{11}CH(CO_2C_2H_5)_2$$

was obtained, B.P. 136–138° C./0.05 mm. 0.05 mm.

Analysis.—Calcd. for $C_{24}H_{33}O_4F_{13}$ (percent): C, 45.6; H, 5.2; F, 39.1. Found (percent): C, 46.0; H, 5.4; F, 39.4.

EXAMPLE 2

General procedure — Hydrolysis of the precursor $R_f(CH_2)_mCH(CO_2C_2H_5)_2$ to the starting reactant $R_f(CH_2)_mCH(CO_2H)_2$ 40% aqueous potassium hydroxide containing 0.2 mole KOH was warmed to 60° C. Then 0.06 mole $R_f(CH_2)_mCH(CO_2C_2H_5)_2$ was added over a ten-minute period. The thick, foamy slurry which formed was maintained at 65° C. for two hours under nitrogen. Then the ethanol formed was distilled from the reaction mass. Severe foaming may occur which is controlled by slow agitation. The residual mass was cooled to at least 0° C. Then a mixture of 75 parts concd. hydrochloric acid and 25 parts water, chilled to −10° C. was added dropwise, maintaining the temperature at 0° C. or below. Stirring becomes difficult.

The resulting thick mass was allowed to warm to room temperature, 2.5 hours, and 100 parts water were added. This mass was extracted with several portions of ether. After drying over sodium sulfate, the ether solution was concentrated, giving a slurry of yellow solids. Recrystallization of the solids from acetone and benzene gave the acids $R_f(CH_2)_mCH(CO_2H)_2$, as described below.

Each product of Example 1, Nos. 1–5, was reacted as above. The products obtained in this example, correspondingly numbered, are listed below:

(1) $n-C_4F_9CH_2CH_2CH(CO_2H)_2$, 32–72% yields, M.P. 112.0–113.0° C.

Analysis.—Calcd. for $C_9H_7F_9O_4$ (percent): C, 30.9; H, 2.0; F, 48.8; molecular weight 350.2; neutral equivalent 175.1. Found (percent): C, 31.2, 31.1; H, 2.1, 2.0; F, 48.6, 48.7; molecular weight; 348, 355; neutral equivalent 176.

(2) $n-C_6F_{13}CH_2CH_2CH(CO_2H)$, 80% yield, M.P. 108–109° C.

Analysis.—Calcd. for $C_{11}H_7F_{13}O_4$ (percent): C, 29.3; H, 1.6; F, 54.9; molecular weight 450. Found (percent): C, 29.45; H, 1.60; F, 55.45; molecular weight 450.

(3) $n-C_8F_{17}CH_2CH_2CH(CO_2H)_2$, 49–55% yields, M.P. 130–131° C.

Analysis.—Calcd. for $C_{13}H_7F_{17}O_4$ (percent): C, 28.4; H, 1.3; F, 58.7; molecular weight, 550.2; neutral equivalent, 275.1. Found (percent): C, 28.6, 28.7; H, 1.3, 1.2; F, 58.7, 59.0; molecular weight, 554, 559; neutral equivalent, 280.

(4) $n-C_{10}F_{21}CH_2CH_2CH(CO_2H)_2$, 63% yield, M.P. 144.5–145.5° C.

Analysis.—Calcd. for $C_{15}H_7F_{21}O_4$ (percent): C, 27.7; H, 1.1; F, 61.4; molecular weight, 650.2. Found (percent): C, 27.9; 28.0; H, 1.0, 1.0; F, 62.3, 62.4; molecular weight, 665, 688.

(5) $n-C_6F_{13}(CH_2)_{11}CH(CO_2H)_2$, 65.8%, M.P. 91.2–92.0° C. Neutral equivalent, calcd. 288, found 294, 295.

If the temperature during addition of hydrochloric acid is not maintained below 0° C., decarboxylation occurs giving the acids $R_fCH_2CH_2CH_2CO_2H$, $R_f=n-C_4F_9$, $n-C_6F_{13}$, $n-C_8F_{17}$ and $n-C_{10}F_{21}$. The same would result in $C_6F_{13}(CH_2)_{11}CH_2CO_2H$.

EXAMPLE 3

General procedure—reaction with dimethylamine and formaldehyde

About one-half of the desired quantity (e.g., 0.1 mole) of $R_f(CH_2)_mCH(CO_2H)_2$ obtained in Example 2 was dissolved in a mixture of 20 parts water and 5 parts tetrahydrofuran. Fifteen drops Bromthymol Blue were added, then aqueous dimethylamine until the indicator color changed from yellow to blue, indicating the diacid was neutralized. The mixtures became thick and 40 parts water were added to allow agitation. The remaining diacid $R_f(CH_2)_mCH(CO_2H)_2$ was added and the mixture was cooled to 0° C. Then formaldehyde (2 moles/mole of acid) was added as an aqueous solution at 0° C. The reaction mixture was allowed to warm to room temperature, 150 parts water were added and the mixture was allowed to stand overnight without agitation. The solids were collected by filtration and characterized as follows. (Each product of Example 2, Nos. 1–5, was reacted as described herein. The products obtained in this example are correspondingly numbered.)

(1) $\quad$ n-$C_4F_9CH_2CH_2C(CO_2H)_2$
$\quad\quad\quad\quad\quad\quad\quad |$
$\quad\quad\quad\quad\quad\quad\quad CH_2N(CH_3)_2$ 33–76% yields, M.P. 94–98° C.

*Analysis.*—Calcd. for $C_{12}H_{14}F_9NO_4$ (percent): C, 35.4; H, 3.5; F, 42.0; N, 3.4. Found (percent): C, 35.7, 35.4; H, 3.6, 3.6; F, 43.0, 43.3; N, 3.3, 3.5.

(2) $\quad$ n-$C_6F_{13}CH_2CH_2C(CO_2H)_2$
$\quad\quad\quad\quad\quad\quad\quad |$
$\quad\quad\quad\quad\quad\quad\quad CH_2N(CH_3)_2$ 95.2%, M.P. 110.5–111.5° C.

*Analysis.*—Calcd. for $C_{14}H_{14}F_{13}NO_4$ (percent): C, 33.15; H, 2.76; F, 48.72; N, 2.76. Found (percent): C, 33.0; H, 2.75; F, 48.75; N, 2.57.

(3) $\quad$ n-$C_8F_{17}CH_2CH_2C(CO_2H)_2$
$\quad\quad\quad\quad\quad\quad\quad |$
$\quad\quad\quad\quad\quad\quad\quad CH_2N(CH_3)_2$ 38–100% yields, M.P. 94.5–96.0° C.

*Analysis.*—Calcd. for $C_{16}H_{14}F_{17}NO_4$ (percent): C, 31.7; H, 2.3; F, 53.2; N, 2.3. Found (percent): C, 31.9, 32.2; H, 2.8, 3.0; F, 53.5, 53.1; N, 2.0, 2.0.

(4) $\quad$ n-$C_{10}F_{21}CH_2CH_2C(CO_2H)_2$
$\quad\quad\quad\quad\quad\quad\quad |$
$\quad\quad\quad\quad\quad\quad\quad CH_2N(CH_3)_2$ (5) $\quad$ n-$C_6F_{13}(CH_2)_{11}C(CO_2H)_2$
$\quad\quad\quad\quad\quad\quad\quad |$
$\quad\quad\quad\quad\quad\quad\quad CH_2N(CH_3)_2$

M.P. 100.5–102.0° C.

*Analysis.*—Calcd. for $C_{23}H_{32}NF_{13}O_4$ (percent): C, 43.6; H, 5.1; N, 2.2; F, 39.0. Found (percent): C, 45.2; H, 5.0; N, 1.8; F, 42.2.

EXAMPLE 4

General Procedure—Preparation of $R_f(CH_2)_mC=CH_2$
$\quad\quad\quad\quad\quad\quad\quad\quad\quad\quad\quad\quad\quad\quad |$
$\quad\quad\quad\quad\quad\quad\quad\quad\quad\quad\quad\quad\quad\quad CO_2H$ Aqueous 10% sodium hydroxide (0.12 mole) was added dropwise at 25–50° C. to a stirred slurry of 0.12 mole of the dimethylaminomethylmalonic acid from Example 3 in 300 parts water containing 17 drops Bromthymol Blue indicator under a nitrogen atmosphere. The resulting mass was heated to 75° C. with rapid agitation. The acid dissolved. Nitrogen was introduced below the surface of the liquid. During four to sixteen hours heating at 95° C. some foaming occurred; the color changes from greenish-yellow to amber. The mass was then cooled to 5–16° C. and 50 parts cold cond. hydrochloric acid were added slowly. Water dilution may be necessary to keep the precipitated acid stirrable. The solids were taken up in ether. The ether solution was dried over sodium sulfate and evaporated. The acids are best purified by sublimation at 0.1 mm. pressure at 50–110° C., depending on the acid itself. Each dimethylaminomalonic acid obtained in Example 3 was reacted as above. The products obtained, correspondingly numbered, are described as follows:

(1) $\quad$ n-$C_4F_9CH_2CH_2C=CH_2$
$\quad\quad\quad\quad\quad\quad\quad |$
$\quad\quad\quad\quad\quad\quad\quad CO_2H$ 37% yield, M.P. 45–47° C.

*Analysis.*—Calcd. for $C_9H_7F_9O_2$ (percent): C, 34.0; H, 2.2; F, 53.6. Found (percent): C, 33.7; H, 2.3; F, 53.7, 54.0.

(2) $\quad$ n-$C_6F_{13}CH_2CH_2C=CH_2$
$\quad\quad\quad\quad\quad\quad\quad |$
$\quad\quad\quad\quad\quad\quad\quad CO_2H$

99%, M.P. 65–66° C.

*Analysis.*—Calcd. for $C_{11}H_7F_{13}O_2$ (percent): C, 31.6; H, 1.7; F, 58.1; molecular weight 418; neutral equivalent 418. Found (percent): C, 31.6; H, 1.7; F, 59.1; molecular weight 405; neutral equivalent 415.

(3) $\quad$ n-$C_8F_{17}CH_2CH_2C=CH_2$
$\quad\quad\quad\quad\quad\quad\quad |$
$\quad\quad\quad\quad\quad\quad\quad CO_2H$ 27–29% yield, M.P. 90.0–92.0° C.

*Analysis.*—Calcd. for $C_{13}H_{17}F_{17}O_2$ (percent): C, 30.1; H, 1.4; F, 62.3. Found (percent): C, 30.8; H, 1.8; F, 62.6.

(4) $\quad$ n-$C_{10}F_{21}CH_2CH_2C=CH_2$
$\quad\quad\quad\quad\quad\quad\quad |$
$\quad\quad\quad\quad\quad\quad\quad CO_2H$ 53% yield, M.P. 114.5–115.0° C.

*Analysis.*—Calcd. for $C_{15}H_7F_{21}O_2$ (percent): C, 29.1; H, 1.1; F, 64.5. Found (percent): C, 28.8; H, 1.1; F, 64.8.

(5) $\quad$ n-$C_6F_{13}(CH_2)_{11}C=CH_2$
$\quad\quad\quad\quad\quad\quad\quad |$
$\quad\quad\quad\quad\quad\quad\quad CO_2H$

M.P. 60–63° C.

*Analysis.*—Calcd. for $C_{20}H_{25}F_{13}O_2$ (percent): F, 45.4. Found (percent): F, 45.2.

EXAMPLE 5

$\quad\quad\quad\quad\quad\quad\quad CO_2H$
$\quad\quad\quad\quad\quad\quad\quad |$
Esterification of $R_f(CH_2)_mC=CH_2$—General Procedure One mole absolute ethanol, 0.04 mole $\quad\quad\quad\quad R_f(CH_2)_mC=CH_2$
$\quad\quad\quad\quad\quad\quad\quad\quad |$
$\quad\quad\quad\quad\quad\quad\quad\quad CO_2H$ 100 parts tolene and 0.04–0.5 part concd. sulfuric acid were heated under reflux for 24 hours under nitrogen, the water being collected during reflux. Excess alcohol was then distilled until the reflux temperature reached 100° C. The mixture was diluted with ether and extracted with 10% aqueous sodium carbonate. The ether solution was then washed with water and dried over anh. sodium sulfate.

The sodium carbonate extracts were acidified with sulfuric acid. Any unreacted acid was recovered; in some cases no unreacted acid was found.

The ether solution of the ester was evaporated and the residual ester distilled under reduced pressure.

Each product of Example 4 was so reacted and the following products, correspondingly numbered, were obtained:

(1) $\quad$ n-$C_4F_9CH_2CH_2C=CH_2$
$\quad\quad\quad\quad\quad\quad\quad |$
$\quad\quad\quad\quad\quad\quad\quad CO_2C_2H_5$ 41% yield, B.P. 37–43° C./1.0–1.5 mm. Hg.

*Analysis.*—Calcd. for $C_{11}H_{11}F_9O_2$: C, 38.2; H, 3.2; F, 49.4. Found (percent): C, 38.2; H, 3.5; F, 49.2.

(2) $\quad$ n-$C_6F_{13}CH_2CH_2C=CH_2$
$\quad\quad\quad\quad\quad\quad\quad |$
$\quad\quad\quad\quad\quad\quad\quad CO_2C_2H_5$ 66% yield, B.P. 64°/0.65 mm., $n_D^{20}$ 1.3504.

*Analysis.*—Calcd. for CHFO: C, 35.0; H, 2.5; F, 55.4. Found (percent): C, 34.5; H, 2.4; F, 55.1.

(3) $\quad$ n-$C_8F_{17}CH_2CH_2C=CH_2$
$\quad\quad\quad\quad\quad\quad\quad |$
$\quad\quad\quad\quad\quad\quad\quad CO_2C_2H_5$ 65% yield, B.P. 67–68° C./0.2 mm.

*Analysis.*—Calcd. for $C_{15}H_{11}F_{17}O_2$ (percent): C, 33.0; H, 2.0; F, 59.1. Found (percent): C, 33.1; H, 2.1; F, 57.8.

(4) $\quad$ n-$C_{10}F_{21}CH_2CH_2C=CH_2$
$\quad\quad\quad\quad\quad\quad\quad |$
$\quad\quad\quad\quad\quad\quad\quad CO_2C_2H_5$

M.P. 32–4° C.

*Analysis.*—Calcd. for $C_{17}H_{11}F_{21}O_2$ (percent): C, 31.6; H, 1.7; F, 61.7. Found (percent): C, 31.6; H, 1.8; F, 63.0.

The ester n-$C_6F_{13}(CH_2)_{11}C=CH_2$
$\quad\quad\quad\quad\quad\quad\quad\quad\quad\quad\quad\quad |$
$\quad\quad\quad\quad\quad\quad\quad\quad\quad\quad\quad\quad CO_2C_2H_5$ may be prepared from

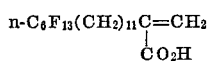

in the same manner.

EXAMPLE 6

Acid halides and amides—General procedure

About 0.014 mole of acid

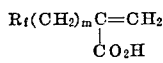

was heated to 50° C. and 0.028 mole of thionyl chloride was added very carefully with agitation. The resulting mass was heated under reflux for one hour. The excess thionyl chloride was then removed by distillation.

If the acid halide is desired, the resulting mass is distilled, usually at reduced pressure. If amides are desired, the mass is treated as follows:

The mass was cooled to room temperature and ammonia or amine was passed into the mass under a condenser cooled with a carobn-ice acetone mixture. After addition of ammonia or amine was complete (about ½ hour), the mass is heated under reflux for 1.5 hours. The excess ammonia or amine was removed by evaporation and the solid amide collected.

The acids obtained in Example 4 can be converted as described above to the acid halides which can then be converted as described above to the amide. The following amide products can be so obtained:

(1)         n-C$_{10}$F$_{21}$CH$_2$CH$_2$C=CH$_2$
                         |
                         CONH$_2$

87% yield, M.P. 152.8–154.5° C.

*Analysis.*—Calcd. for C$_{15}$H$_8$F$_{21}$NO (percent): C, 29.2; H, 1.3; F, 64.7; N, 2.3. Found (percent): C, 28.3; H, 1.4; F, 65.0; N, 3.0.

The amides n-C$_4$F$_9$CH$_2$CH$_2$C=CH$_2$, n-C$_6$F$_{13}$CH$_2$CH$_2$C=CH$_2$,
                        |                                          |
                        CO$_2$NH$_2$                               CONH$_2$ n-C$_8$F$_{17}$CH$_2$CH$_2$C=CH$_2$ and n-C$_6$F$_{13}$(CH$_2$)$_{11}$C=CH$_2$
                  |                                       |
                  CONH$_2$                                CONH$_2$ may be prepared by the same procedure from the acids described in Example 4 and ammonia. Use of primary amines such as methylamine and the acids of Example 4 would give the amides n-C$_4$F$_9$CH$_2$CH$_2$C=CH$_2$, n-C$_6$F$_{13}$CH$_2$CH$_2$C=CH$_2$,
                 |                                        |
                 CONHCH$_3$                               CONHCH$_3$ n-C$_8$F$_{17}$CH$_2$CH$_2$C=CH$_2$, n-C$_{10}$F$_{21}$CH$_2$CH$_2$C=CH$_2$ and
                  |                                         |
                  CONHCH$_3$                                CONHCH$_3$ n-C$_6$F$_{13}$(CH$_2$)$_{11}$C=CH$_2$.
                         |
                         CONHCH$_3$ Likewise, by use of dialkylamines such as dimethylamine, the same procedure would give the corresponding N,N-dimethylamides R$_f$(CH$_2$)$_m$C=CH$_2$.
          |
          CON(CH$_3$)$_2$ Where the amine is a liquid, the procedure above is modified to the extent that the liquid amine is added dropwise to the acid halide. Use of dimethylamine, ethylamine, aniline, piperidine or morpholine in such procedure with the acids of Example 4 would give the amides

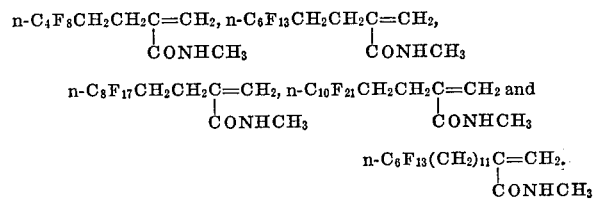

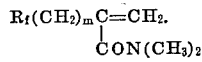

and

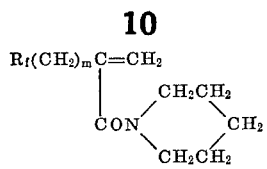

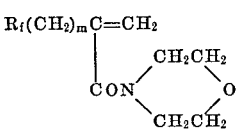

EXAMPLE 7

Nitriles R$_f$(CH$_2$)$_m$C=CH$_2$—General Procedure
                     |
                     CN About 0.01 mole of the amide

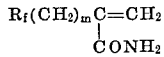

was carefully dissolved in about 0.05 mole thionyl chloride. The resulting solution was heated under reflux in a dry atmosphere for two hours. The excess thionyl chloride and volatile reaction products were then distilled. The residue was sublimed at reduced pressure of about 0.2 mm. at 65–85° C. The solid nitriles were recovered. Using

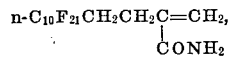

a 22% yield of

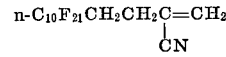

was obtained, M.P. 72–75° C.

*Analysis.*—Calcd. for C$_{15}$H$_6$F$_{21}$N (percent): C, 30.1; H, 1.0; F, 66.6; N, 2.3. Found (percent): C, 29.8; H, 1.2; F, 66.9; N, 3.0.

Using the same procedure, the amides

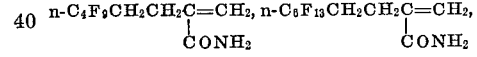

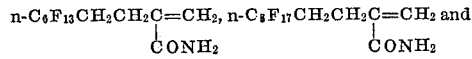

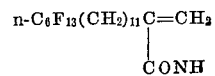

may be converted to the nitriles

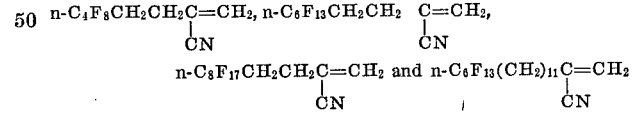

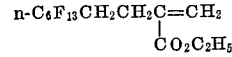

EXAMPLE 8

Polymer preparation

A solution of n-C$_6$F$_{13}$CH$_2$CH$_2$C=CH$_2$
               |
               CO$_2$C$_2$H$_5$ in tetrahydrofuran was prepared and freed of oxygen and water by sweeping with nitrogen. The solution was cooled to −76° C. and 0.0002 mole of a 1 M solution of green sodium-naphthalene solution in tetrahydrofuran (previously dried with LiAlH$_4$) was added under nitrogen. The mixture was allowed to warm to about 0° C., then cooled again to −76° C. and a similar amount of the sodium-naphthalene solution was added. The mixture was then allowed to warm to room temperature and 5 parts ethanol were added to destroy the catalyst.

The mass was poured into dilute sulfuric acid with stirring and the two phases extracted with ether. The ether was dried over anh. sodium sulfate. From the ether were recovered by evaporation a higher molecular weight polymer of clear, light tan appearance, a deep brown, viscous lower molecular weight polymer and unconverted

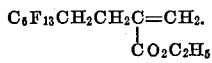

conversion to polymer was 26.7%. The higher molecular weight polymer was dissolved in 1,1,2-trichloro-1,2,2-trifluoroethane. Evaporation of the solution on glass gave films which were both oil and water repellent, as determined by contact angles of water and hexadecane.

EXAMPLE 9

Polymer preparation

A sample of $$\text{n-C}_8\text{F}_{17}\text{CH}_2\text{CH}_2\text{C}=\text{CH}_2$$
$$|$$
$$\text{CO}_2\text{C}_2\text{H}_5$$

was irradiated with a high intensity ultraviolet source (2537 A.) under nitrogen. After one week, a white viscous material was obtained. The polymer was purified by dissolving in 1,1,2-trichloro-1,2,2-trifluoroethane and precipitating by adding benzene. The polymer had an inherent viscosity of 0.04 as a 0.1% solution in $CF_2ClCFCl_2$ at 30° C.

EXAMPLE 10

Polymer preparation

Two parts of

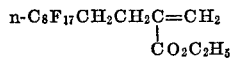

in 30 parts 1,1,2-trichloro-1,2,2-trifluoroethane was irradiated with the ultraviolet source of Example 9. After two days, a quite thick, pasty polymer was obtained, inherent viscosity 0.02–0.06, 0.1% in $CF_2ClCFCl_2$ at 30° C.

EXAMPLE 11

Polymer preparation

Six parts of $$\text{n-C}_{10}\text{F}_{21}\text{CH}_2\text{CH}_2\text{C}=\text{CH}_2$$
$$|$$
$$\text{CONH}_2$$

in 45 parts 1,1,2-trichloro-1,2,2-trifluoroethane were irradiated with the ultraviolet source of Example 9 for 30 hours. Six parts of polymer were obtained. The polymer had an inherent viscosity of 0.73, 0.1% in $CF_2ClCFCl_2$ at 30° C.

EXAMPLE 12

Polymer preparation

A mixture of one part methyl methacrylate and 5.5 parts

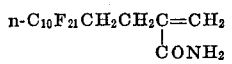

dissolved in 30 parts 1,1,2-trichloro-1,2,2-trifluoroethane, was irradiated with the ultraviolet source of Example 9 for four days. A clear viscous mass (3.7 parts, 57%) was obtained by evaporation, redissolving in the same solvent and precipitation with benzene, inherent viscosity 0.04, 0.1% in $CF_2ClCFCl_2$ at 30° C.

EXAMPLE 13

Polymer preparation

A solution of 4.5 parts of

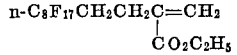

1.0 part methyl methacrylate and 0.005 part $\alpha,\alpha'$-azobis (isobutyronitrile) in 4 parts benzene was heated for 6.5 hours under nitrogen at 81° C. The solution was then cooled and poured into 150 cc. of petroleum ether, giving 1.3 parts of white polymer having a softening point of 105–125° C. It contained 28.1% F. indicating a copolymer of 4.23 methyl methacrylate units per mole of $$\text{n-C}_6\text{F}_{13}\text{CH}_2\text{CH}_2\text{C}=\text{CH}_2$$
$$|$$
$$\text{CO}_2\text{C}_2\text{H}_5$$

The polymer was repellent to water and hexadecane on plates.

EXAMPLE 14

Polymer preparation

A sample of

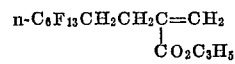

was irradiated in trichlorotrifluoroethane with a high intensity ultraviolet lamp (2537 A.) under nitrogen. The polymer was purified as in Example 9. The polymer had an inherent viscosity of 0.01 as a 0.1% solution in $$CF_2ClCFCl_2$$

at 30° C.

EXAMPLE 15

Polymer preparation

A sample of $$\text{n-C}_{10}\text{F}_{21}\text{CH}_2\text{CH}_2\text{C}=\text{CH}_2$$
$$|$$
$$\text{CO}_2\text{H}$$

in trichlorotrifluoroethane was irradiated with the ultraviolet source and purified as in Example 9. The resultant polymer had an inherent viscosity of 0.009 as a 0.1% solution in $CF_2ClCFCl_2$ at 30° C.

EXAMPLE 16

Polymer preparation

A sample of $$\text{n-C}_6\text{F}_{13}(\text{CH}_2)_{11}\text{C}=\text{CH}_2$$
$$|$$
$$\text{CO}_2\text{H}$$

in trichlorotrifluoroethane was irradiated and purified as in Example 9. The resulting polymer had an inherent viscosity of 0.05–0.07 as a 0.1% solution in $CF_2ClCFCl_2$ at 30° C.

EXAMPLE 17

Polymer preparation

A sample of

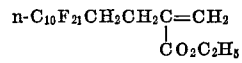

was contacted with a few drops of boron trifluoride etherate. When polymerization appeared complete, the mixture was dissolved in a mixture of acetone and trichlorotrifluoroethane. The solvent was then evaporated. The polymer had an inherent viscosity of 0.01–0.03 as a 0.1% solution in $CF_2ClCFCl_2$ at 30° C.

EXAMPLE 18

Application to textiles

The polymers of Examples 9, 10, 11, 12, 14, 15, and 16 were each dissolved in 1,1,2-trichloro - 1,2,2 - trifluoroethane and applied to a 65/35 blend of "Dacron" polyester/cotton-"Thermosol" dyed. The treated fabrics were air dried, then heated at 180° C. for three minutes. Oil repellency was evaluated using test method 118–1966T of the American Association of Textile Chemists and Colorists. Water repellency was evaluated using test method 22–1952 of the American Association of Textile Chemists and Colorists. The percent loading on weight of fabrics (percent OWF) and repellencies are shown below in the following table. The fabrics were then laundered for 12 minutes using hot water, warm rinse in a home automatic laundry machine using 29 g. commercial, home laundry detergent in a four-pound load. Total washing and rinsing time is 40 minutes. After spin drying, the fabrics are allowed to dry in air at ambient temperatures.

The dry fabrics are again evaluated for repellency, as shown in the following table:

REPELLENCY RESULTS

| Polymer Example | Percent, OWF | Initial oil | Water | After laundering Oil |
|---|---|---|---|---|
| 9 | 4.2 | 6 | 70 | 4 |
|   | 0.6 | 6 | N.T. | 5 |
|   | 0.2 | —6 | N.T. | 4 |
| 10 | 7.9 | 6 | N.T. | 6 |
|   | 2.9 | 5 | N.T. | 2 |
| 11 | 0.5 | 4 | N.T. | 3 |
| 12 | 0.7 | 5 | N.T. | 1 |
| 14 | 0.24 | 2 | N.T. | 0 |
| 15 | 0.1 | 4 | N.T. | 1 |
| 16 | 3.17 | 1 | N.T. | 0 |

NOTE.—N.T.=Not tested.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound represented by the structural formula

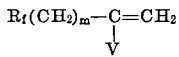

$$R_f(CH_2)_m-C=CH_2$$
$$\phantom{R_f(CH_2)_m-}V$$

wherein $R_f$ is a perfluoroalkyl group of four to twenty carbon atoms, $m$ is an integer of two through twelve, and V is carboxy or lower carbalkoxy.

2. A compound of claim 1 wherein V is carboxy.

3. A compound of claim 1 wherein V is lower carbalkoxy.

References Cited

UNITED STATES PATENTS 2,951,051  8/1960  Tiers _____ 260—408 X
2,730,543  1/1956  Rendal et al. _____ 260—465.7

OTHER REFERENCES

Pg. 582s "Acrylonitrile" Chem. Abs. 7th collective index vol. 56–65 (1962–1965).

LEWIS GOTTS, Primary Examiner

C. L. MILLS, Assistant Examiner

U.S. Cl. X.R.

8—115.5, 115.7, 116 R; 117—135.5; 260—66, 80, 83.5, 85.5 A, 85.5 ES, 86.3, 87.7, 88.1 PC, 88.1 PN, 88.7 A, 89.3, 89.7 R, 404, 465.7